United States Patent [19]
Bae

[11] Patent Number: 6,033,336
[45] Date of Patent: Mar. 7, 2000

[54] REDUCTION DEVICE HAVING REVERSE ROTATION PREVENTING FUNCTION

[76] Inventor: Myung soon Bae, 101-1504 Daeback Apt. 540 Okkye-dong, Gumi-shi, Kyungsangbuk-do, Rep. of Korea

[21] Appl. No.: 09/260,177

[22] Filed: Mar. 1, 1999

[30] Foreign Application Priority Data

May 29, 1998 [KR] Rep. of Korea ............. 98-19936

[51] Int. Cl.[7] .................................................. F16H 1/28
[52] U.S. Cl. .................................................. 475/341
[58] Field of Search ...................................... 475/341

[56] References Cited

U.S. PATENT DOCUMENTS

| 1,432,090 | 10/1922 | Simpson | 475/341 |
| 2,955,487 | 10/1960 | Malley | 475/341 |
| 3,705,522 | 12/1972 | Ogawa | 475/341 |

*Primary Examiner*—Dirk Wright
*Attorney, Agent, or Firm*—Darby & Darby

[57] ABSTRACT

A reduction device having a reverse rotation preventing function is disclosed. The reduction device comprises: a case having a pair of case parts assembled with each other to define a receiving space; a fixed ring gear coupled between and to the pair of case parts and having a first internal gear part; an output member rotatably received in the receiving space of the case and having an output ring gear and an output shaft, the output ring gear having a second internal gear part, the output shaft being formed on a bottom wall of the output member; a carrier received in the receiving space of the case and having one end rotatably supported by the bottom wall of the output member and the other end being formed with an input shaft, the carrier further having a pair of circular plates which define a receiving room therebetween; and a plurality of double planetary gears received in the receiving room of the carrier and rotatably secured to the pair of circular plates, each of the double planetary gears having a first planetary gear part which is meshed with the first internal gear part of the fixed ring gear and a second planetary gear part which is meshed with the second internal gear part of the output member, the first and second planetary gear parts of each double planetary gear being integrally formed with each other.

4 Claims, 7 Drawing Sheets

REDUCTION DEVICE HAVING REVERSE ROTATION PREVENTING FUNCTION

BACKGROUND OF THE INVENTION

1. Field of the Invention

The present invention relates to a reduction device having a reverse rotation preventing function, and more particularly, the present invention relates to a reduction device having a reverse rotation preventing function, which uses a planetary gear for reducing a rotational velocity of an output shaft when transferring a rotational velocity of an input shaft to the output shaft in various machine tools or industrial machines, whereby high reduction ratio is obtained while effectively restraining the input shaft from being reversely rotated by preventing driving force of the output shaft from being transferred back to the input shaft.

2. Description of the Prior Art

Generally, various machine tools or industrial machines are equipped with a reduction device which serves to change a driving RPM generated by and transferred from a power source to other RPMs suitable for operating them.

For example, in a conveyor such as a belt conveyor, chain conveyor or the like, since it is required to apply force for moving a belt or chain while reducing a driving RPM for causing the belt or chain to be moved at a predetermined velocity, driving means having a reduction device, such as a geared motor, is provided. Further, in a lifting facility for lifting a weight, such as a hoist, since it is required to keep a height of a lifted weight constant, a separate reverse rotation preventing device is provided for braking a reverse load transferred to an input shaft from an output shaft when a power source is shut off.

On the other hand, a typical reduction device uses a combination of a plurality of spur gears each of which has a different number of teeth, or adopts a reduction scheme which employs warm gears.

However, as described above, a reduction device applied to a lifting facility has a problem in that a separate reverse rotation preventing device must be additionally provided for preventing a load of an output shaft from being transferred to an input shaft. Also, a reduction device which uses a combination of a plurality of spur gears or warm gears, suffer from defects in that since a kinematic mechanism thereof is relatively involved, the number of components increases whereby volume and manufacturing cost are elevated, and since the whole load acts on only a single tooth, one at a time when gears are meshed one with another, each tooth is apt to be abraded whereby endurability and operation reliability are deteriorated.

SUMMARY OF THE INVENTION

Accordingly, the present invention has been made in an effort to solve the problems occurring in the prior art, and an object of the present invention is to provide a reduction device having a reverse rotation preventing function, which is easily manufactured by an existing gear cutting machine without using special manufacturing equipment or a peculiar manufacturing technique thereby to be suited for mass production while reducing manufacturing cost, has a simple structure adapted to obtain high reduction ratio, and accomplishes a reverse rotation preventing function without using a separate arrangement thereby to restrain a load of an output shaft from being transferred to an input shaft while improving endurability and operation reliability.

In order to achieve the above object, according to one aspect of the present invention, there is provided a reduction device comprising: a case having a pair of case parts assembled with each other to define a receiving space, each case part having a center opening to be communicated with the receiving space; a fixed ring gear coupled between and to the pair of case parts and being formed with a first internal gear part having a first predetermined number of teeth; an output member rotatably received in the receiving space of the case and having an output ring gear and an output shaft, the output ring gear being formed with a second internal gear part having a second predetermined number of teeth, the output shaft being formed on a bottom wall of the output member and projecting out of the case through a first center opening, the first and second internal gear parts having the same inner diameter; a carrier received in the receiving space of the case and having one end rotatably supported by the bottom wall of the output member and the other end being formed with an input shaft which projects out of the case through a second center opening and to which driving force is transferred, the carrier further having a pair of circular plates which define a receiving room therebetween; and a plurality of double planetary gears received in the receiving room of the carrier and rotatably secured to the pair of circular plates, each of the double planetary gears having a first planetary gear part which is meshed with the first internal gear part of the fixed ring gear and a second planetary gear part which is meshed with the second internal gear part of the output member, the first and second planetary gear parts of each double planetary gear being integrally formed with each other.

According to another aspect of the present invention, the input shaft of the carrier is provided as a separate element and has one end which extends into the receiving room through a first circular plate remote from the output member and is rotatably supported by a second circular plate adjacent to the output member and the other end which projects out of the case through the second center opening, the input shaft further having a first sun gear which is fastened around a circumferential outer surface thereof and is meshed with the first planetary gear parts of the plurality of double planetary gears.

According to still another aspect of the present invention, the fixed ring gear is integrally formed on an inner surface of the case.

According to yet still another aspect of the present invention, there is provided a reduction device comprising: a case having a pair of case parts assembled with each other to define a receiving space, each case part having a center opening to be communicated with the receiving space, the case possessing a first fixed ring gear which is integrally formed on an inner surface thereof and has a first internal gear part; a second fixed ring gear coupled between and to the pair of case parts and having a second internal gear part; an output member rotatably received in the receiving space of the case and having an output ring gear and an output shaft, the output ring gear having a third internal gear part, the output shaft being formed on a bottom wall of the output member and projecting out of the case through a first center opening; a carrier received in the receiving space of the case and having a pair of circular plates defining a receiving room therebetween, a first input shaft having one end projecting out of the case through a second center opening, the first input shaft possessing a first sun gear which is fastened around a circumferential outer surface thereof, a second input shaft having one end which is formed with an outward flange part and by which the other end of the first input shaft is rotatably supported and the other end which extends into the receiving room through a first circular plate remote from the output member and is rotatably supported by a second circular plate adjacent to the output member, the second input shaft possessing a second sun gear which is fastened around a circumferential outer surface thereof, and a mounting plate supported by the outward flange part of the second input shaft for defining a mounting space therebetween; a plurality of single planetary gears received in the mounting space and rotatably secured to the outward flange part and the mounting plate, each of the single planetary gear being meshed with the first sun gear of the first input shaft and the first internal gear part of the first fixed ring gear; and a plurality of double planetary gears received in the receiving room of the carrier and rotatably secured to the pair of circular plates, each of the double planetary gears having a first planetary gear part which is meshed with the second sun gear of the second input shaft and the second internal gear part of the second fixed ring gear and a second planetary gear part which is meshed with the third internal gear part of the output member, the first and second planetary gear parts of each double planetary gear being integrally formed with each other.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
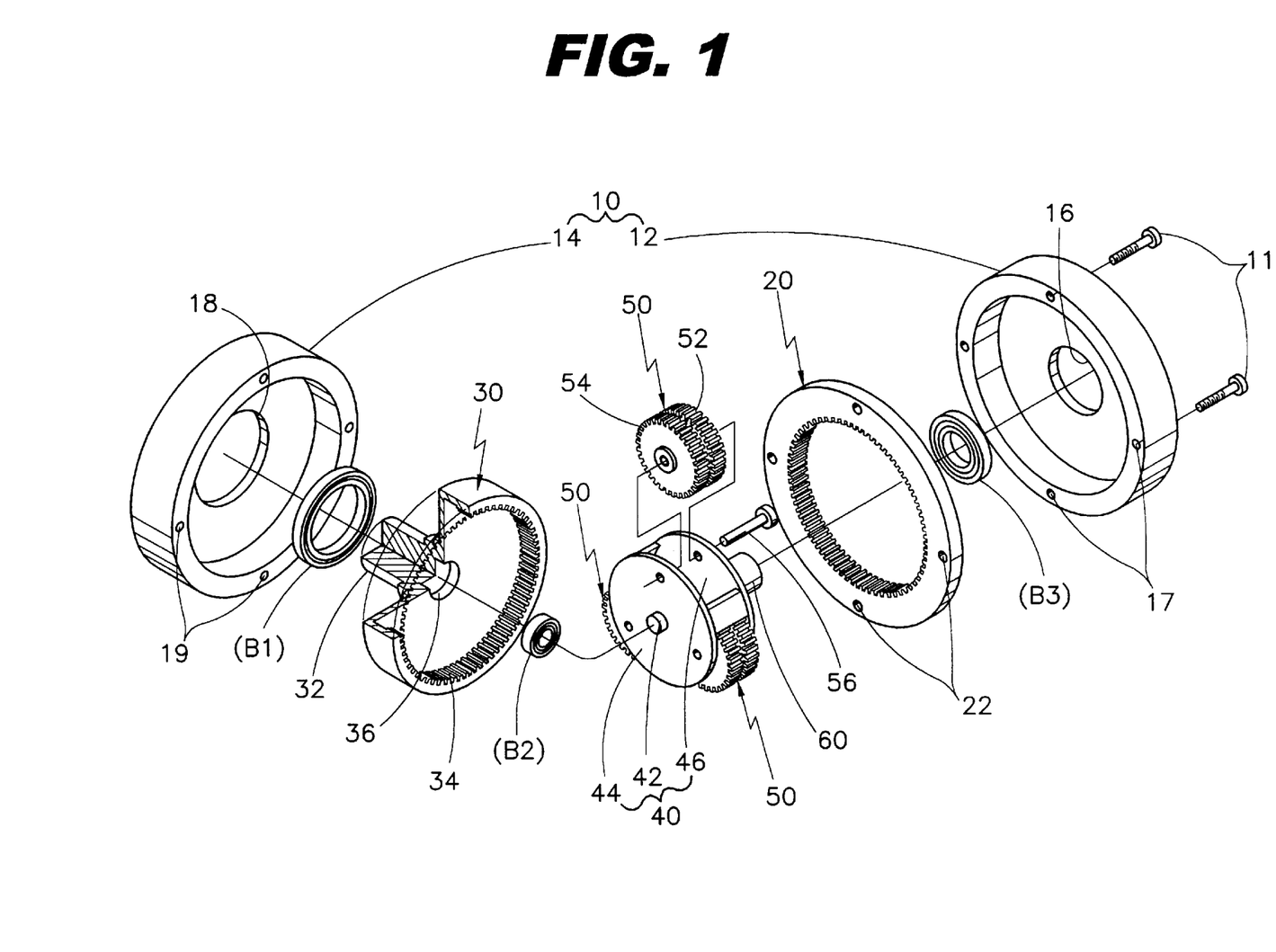
FIG. 1 is an exploded perspective view illustrating a reduction device having a reverse rotation preventing function in accordance with a first embodiment of the present invention.
Figure 2:
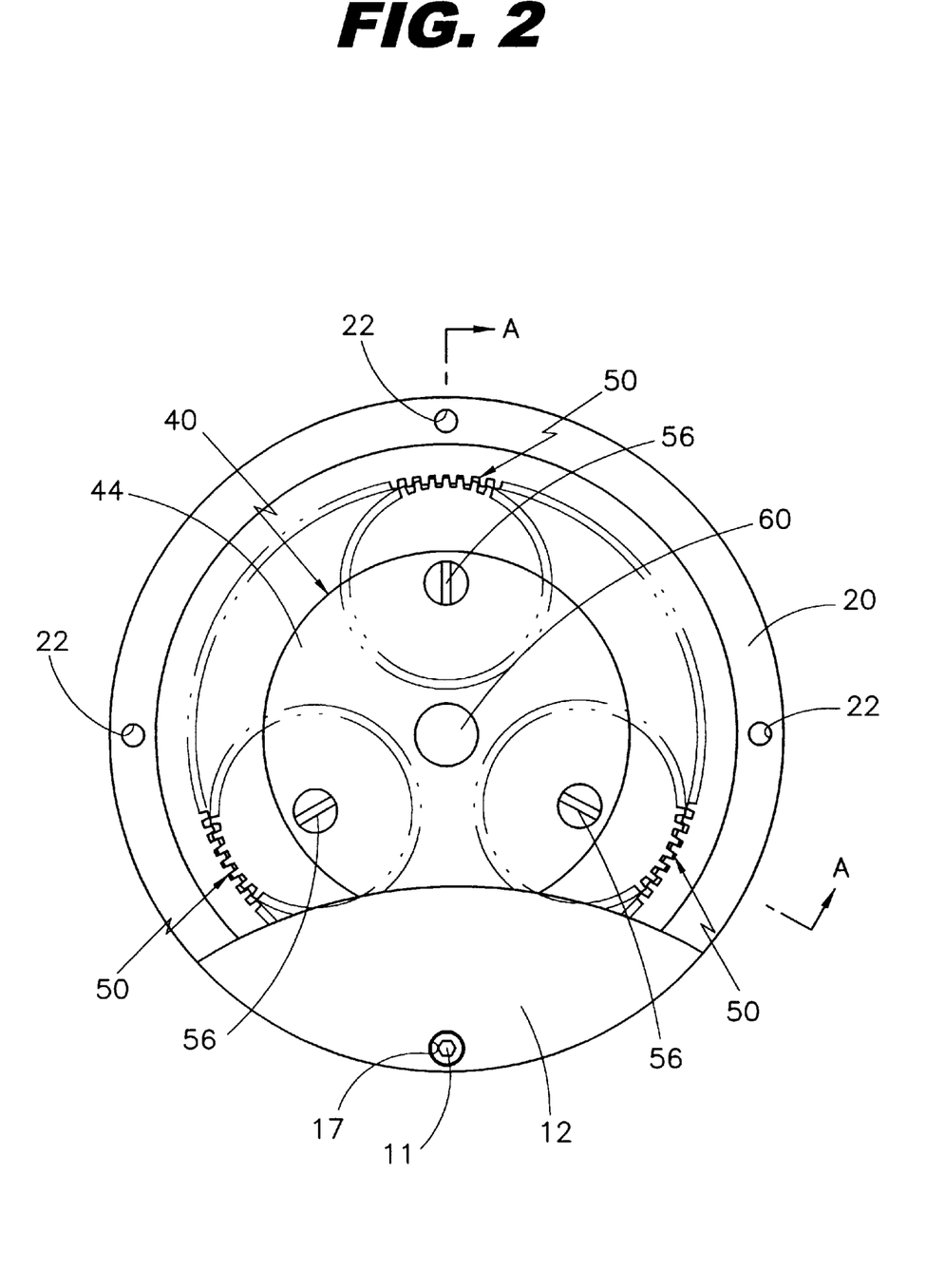
FIG. 2 is a partially sectioned side view of the reduction device of FIG. 1.
Figure 3:
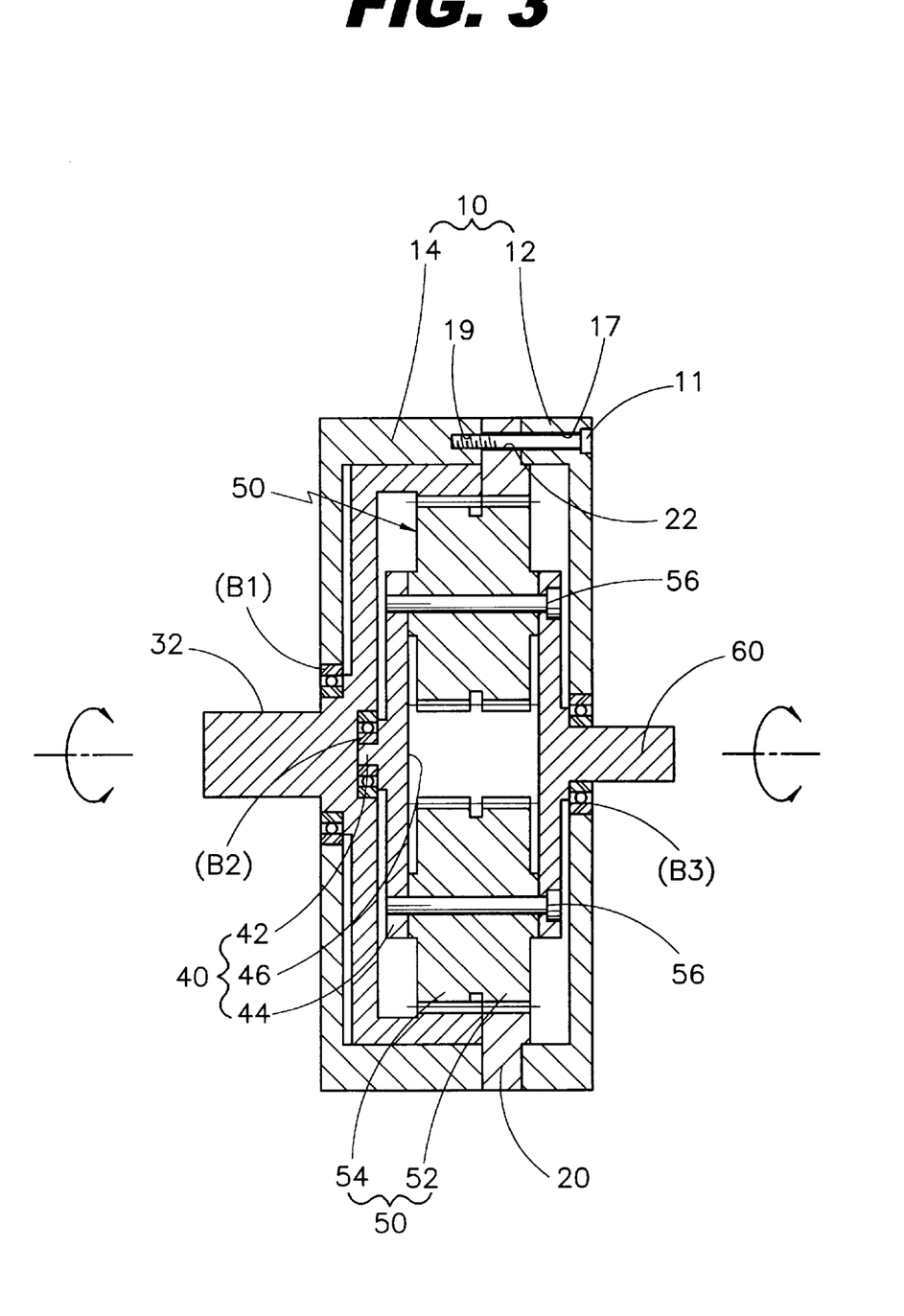
FIG. 3 is a cross-sectional view taken along the line A—A of FIG. 2.

Referring to FIG. 1, there is shown an exploded perspective view illustrating a reduction device having a reverse rotation preventing function in accordance with a first embodiment of the present invention. FIG. 2 is a partially sectioned side view of the reduction device of FIG. 1, and FIG. 3 is a cross-sectional view taken along the line A—A of FIG. 2.

A reduction device having a reverse rotation preventing function of the present invention includes a carrier 40 which is rotated by rotating force generated by driving means and transferred to an input shaft 60 thereof, three double planetary gears 50 which cooperatively perform a function of a reduction gear section while being integrally rotated with the carrier 40, an output member 30 which outputs the rotating force reduced by the reduction gear section and is formed with a fixed ring gear 20, and a case 10 which defines a receiving space for receiving the carrier 40, the three planetary gears 50 and the output member 30.

The case 10 defining the receiving space is constructed such that it can be disassembled. In other words, the case 10 has a first case part 12 which is placed adjacent to an input side of driving force and has a first center opening 16 formed through a center portion of a bottom wall thereof and a plurality of locking holes 17 formed through a cylindrical side wall thereof such that they are circumferentially spaced apart one from another, and a second case part 14 which is detachably coupled to the first case part 12 and has a second center opening 18 formed through a center portion of a bottom wall thereof and a plurality of locking holes 19 formed through a cylindrical side wall thereof such that they are circumferentially spaced apart one from another. The first and second center openings 16 and 18 are communicated with the receiving space.

The fixed ring gear 20 is intervened between and coupled to the first and second case parts 12 and 14 by a plurality of locking bolts 11, and, as best shown in FIG. 1, has a ring-shaped configuration which possesses a first internal gear part formed on a circumferential inner surface thereof. The fixed ring gear 20 is formed with a plurality of locking holes 22 through which the plurality of locking bolts 11 pass, respectively. The first internal gear part has a first predetermined number of teeth.

While it is preferred that the fixed ring gear 20 is intervened as a separate element between the first and second case parts 12 and 14 as described above, it is to be readily understood that the fixed ring gear 20 may be integrally formed on a circumferential inner surface of the first case part 12 rather than being provided as a separate element.

The output member 30 is rotatably received in the receiving space defined in the case 10, and has a cylindrical side wall and a bottom wall which are integrally formed with each other. The output member 30 includes an output shaft 32 and an output ring gear 34. The output shaft 32 is provided on an outer surface of the bottom wall of the output member 30, and the output ring gear 34 is provided to the cylindrical side wall of the output member 30. The output shaft 32 projects out of the case 10 through the second center opening 18. The output shaft 32 is rotatably supported by a bearing B1 which is fitted into the second center opening 18. The output ring gear 34 has a second internal gear part formed on a circumferential inner surface thereof. The second internal gear part has the same inner diameter as that of the first internal gear part. Further, the second internal gear part has a second predetermined number of teeth which is different from the first predetermined number of teeth of the first internal gear part. Although it is preferred that the output ring gear 34 is integrally formed on a circumferential inner surface of the cylindrical side wall of the output member 30, it is to be readily understood that the output ring gear 34 may be provided as a separate element to be closely fitted into an opening defined by the cylindrical side wall of the output member 30.

The carrier 40 is received in the receiving space of the case 10. The carrier 40 has a pair of circular plates 44 which are securely and rigidly connected to each other by a plurality of connecting pieces while they are spaced apart from each other to define a receiving room 46 therebetween. A guide projection 42 is integrally formed on a center portion of an outer surface of a first circular plate 44. The guide projection 42 is rotatably supported by the bottom wall of the output member 30. Also, an input shaft 60 to which the driving force is transferred, is integrally formed on a center portion of an outer surface of a second circular plate 44. The input shaft 60 projects out of the case 10 through the first center opening 16.

In greater detail, the guide projection 42 of the carrier 40 is rotatably supported by a bearing B2 fitted into a groove 36 formed on a center portion of an inner surface of the bottom wall of the output member 30. Also, the input shaft 60 of the carrier 40 is rotatably supported by a bearing B3 fitted into the first center opening 16 of the first case part 12. Therefore, precession and eccentricity of the carrier 40 are prevented.

The three double planetary gears 50 are received in the receiving room 46 of the carrier 40 and rotatably secured to the pair of circular plates 44 by three fixing pins 56, respectively. Each double planetary gear 50 has a first planetary gear part 52 which is meshed with the first internal gear part of the fixed ring gear 20 and a second planetary gear part 54 which is meshed with the second internal gear part of the output ring gear 34 of the output member 30. The first and second planetary gear parts 52 and 54 of each double planetary gear 50 are integrally formed with each other.

Of course, although it is explained that three double planetary gears 50 are provided, it is to be readily understood that two or more than three double planetary gears 50 may be provided instead. For this reason, the driving force inputted to the input shaft 60 is transferred to the output shaft 32 while being uniformly distributed over at least two double planetary gears 50. Accordingly, it is possible to prevent a tooth from being abraded due to the fact that the whole load inputted to the input shaft 60 acts on the single tooth, and the driving force inputted to the input shaft 60 can be stably transferred to the output shaft 32 of the output member 30 in a reduced state. As described above, though it is preferred that three double planetary gears 50 are provided, it is to be readily acknowledged by a person skilled in the art that the number and reduction ratio of the double planetary gears 50 can be changed relying upon a magnitude of load and a desired reduction precision. Also, bearings may be fitted around the fixing pins 56, respectively, to allow the respective double planetary gears 50 to be smoothly rotated.

Moreover, the first planetary gear part 52 of the double planetary gear 50 and the first internal gear part of the fixed ring gear 20 are formed such that they have the same module, and the second planetary gear part 54 of the double planetary gear 50 and the second internal gear part of the output ring gear 34 are formed such that they have the same module.

Due to the fact that the first and second planetary gear parts 52 and 54 have a different number of teeth, elevated reduction ratio of high precision can be obtained. For example, when the first and second planetary gear parts 52 and 54 are formed such that they have the same module, it is possible to obtain elevated reduction ratio by causing the second planetary gear part 54 to have a number of teeth less than the first planetary gear part 52, and it is possible to obtain lowered reduction ratio by causing the second planetary gear part 54 to have a number of teeth greater than the first planetary gear part 52. Further, reduction ratio of high precision, which may be required by a certain facility, can be obtained by constructing the first and second planetary gear parts 52 and 54 such that the difference in the number of teeth between them is small.

Also, since it is possible to obtain reduction ratio of high precision by forming the first and second planetary gear parts 52 and 54 such that they have different modules, for example, even if they have the same number of teeth, by forming the modules such that they have a extremely small deviation which is no greater than 1, elevated reduction ratio of high precision can be obtained.

Hereinafter, operations of the reduction device having a reverse rotation preventing function of the present invention, constructed as mentioned above, will be described in detail.

If the input shaft 60 is rotated by the driving force inputted thereto from the outside driving means, the carrier 40 integrally secured to the input shaft 60 is also rotated, and the three double planetary gears 50 received in the receiving room 46 of the carrier 40 rotate around the fixing pins 56, respectively. In other words, as the double planetary gears 50 rotate on their own axes while being separated from an axis of the carrier 40 by a predetermined distance, the first planetary gear parts 52 of the double planetary gears 50 are meshed with the first internal gear part of the fixed ring gear 20 to revolve around the axis of the carrier 40.

At the same time, since the second planetary gear parts 54 of the double planetary gears 50 are meshed with the second internal gear part of the output ring gear 34, the output member 30 including the output shaft 32 is rotated as the double planetary gears 50 is rotated. At this time, rotational velocity of the input shaft 60 rotated by the outside driving means (not shown) is changed relying upon differences in a number of teeth and a module among the first and second planetary gear parts 52 and 54 of the double planetary gear 50 and the first internal gear part of the fixed ring gear 20 and the second internal gear part of the output ring gear 34, to be represented as rotational velocity of the output shaft 32. That is, reduction ratio i of the reduction device having a reverse rotation preventing function according to the present invention is denoted as ratio of rotational velocity $n2$ of the output shaft 32 to rotational velocity $n1$ of the input shaft 60, as given by an equation $i=n2/n1$. The reduction ratio can be otherwise denoted as ratio of a number of teeth $Zd$ or a module of the fixed ring gear 20 to a number of teeth $Zc$ or a module of the output ring gear 34 by ratio of a number of teeth $Zb$ or a module of the second planetary gear part 54 to a number of teeth $Za$ or a module of the first planetary gear part 52, as given by an equation $i=(Zd/Zc)\cdot(Zb/Za)$.

On the other hand, as described above, while the output member 30 including the output shaft 32 is rotated in a state that it is reduced in rotational velocity at a predetermined reduction ratio in one direction which is the same rotating direction as the input shaft 60 or in the other direction, if the driving means is shut off to keep the input shaft 60 to a no-load state where no load is transferred to the input shaft 60, a force for reversely rotating the input shaft 60 is generated due to a reverse load produced by the output shaft 32. At this time, even if the reverse load is transferred through the second internal gear part of the output ring gear 34 of the output member 30 to the second planetary gear part 54 of the double planetary gear 50, since the first planetary gear part 52 of the double planetary gear 50, having a number of teeth or a module which is different from that of the second planetary gear part 54, is meshed with the first internal gear part of the fixed ring gear 20, the reverse load is braked.

Accordingly, because the reverse load of the output shaft 32 is effectively braked by the double planetary gear 50 not to be transferred to the input shaft 60, the reduction device of the present invention accomplishes a reverse rotation preventing function without using a separate arrangement.

Figure 4:
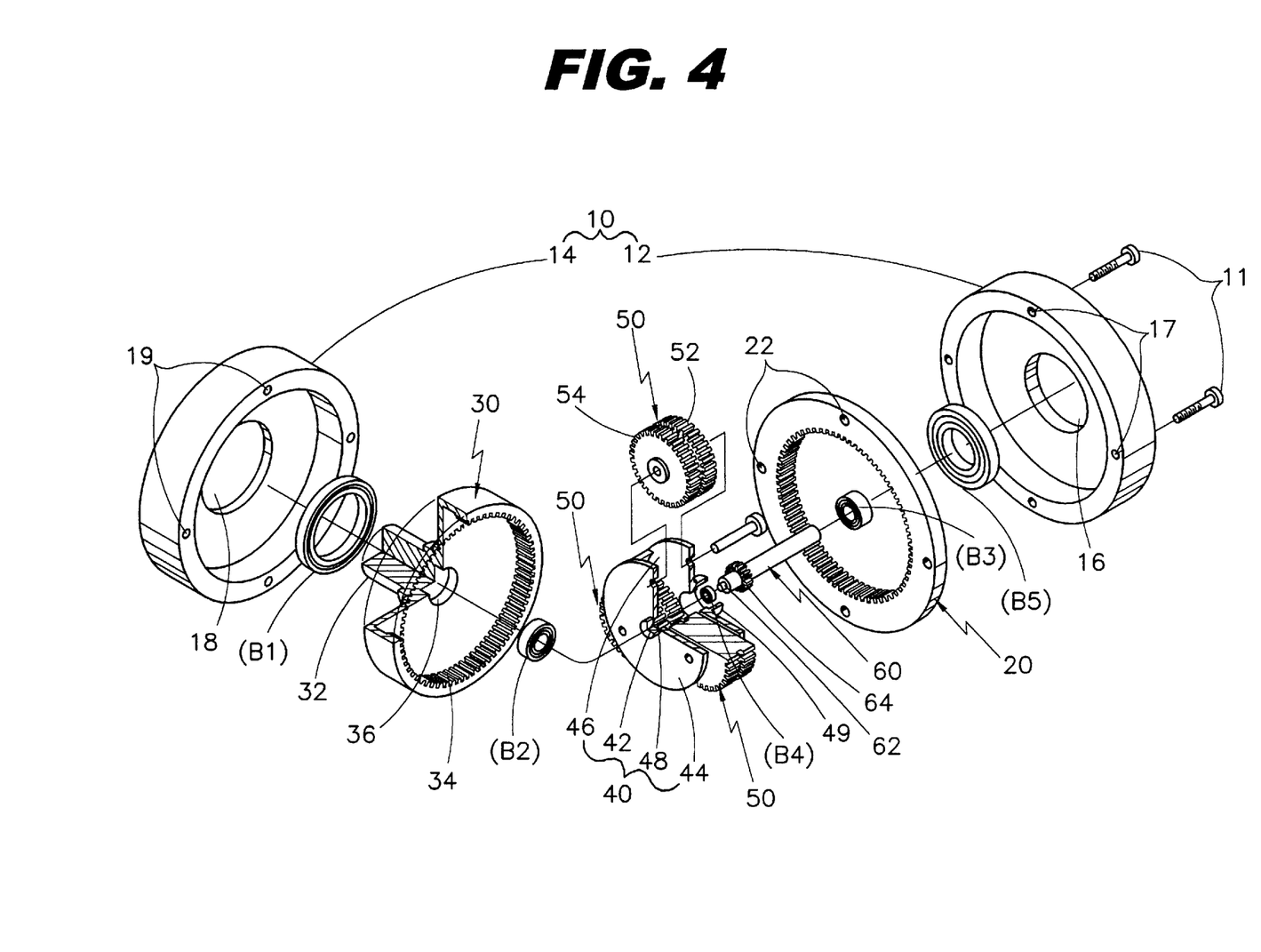
FIG. 4 is an exploded perspective view illustrating another reduction device having a reverse rotation preventing function in accordance with a second embodiment of the present invention.
Figure 5:
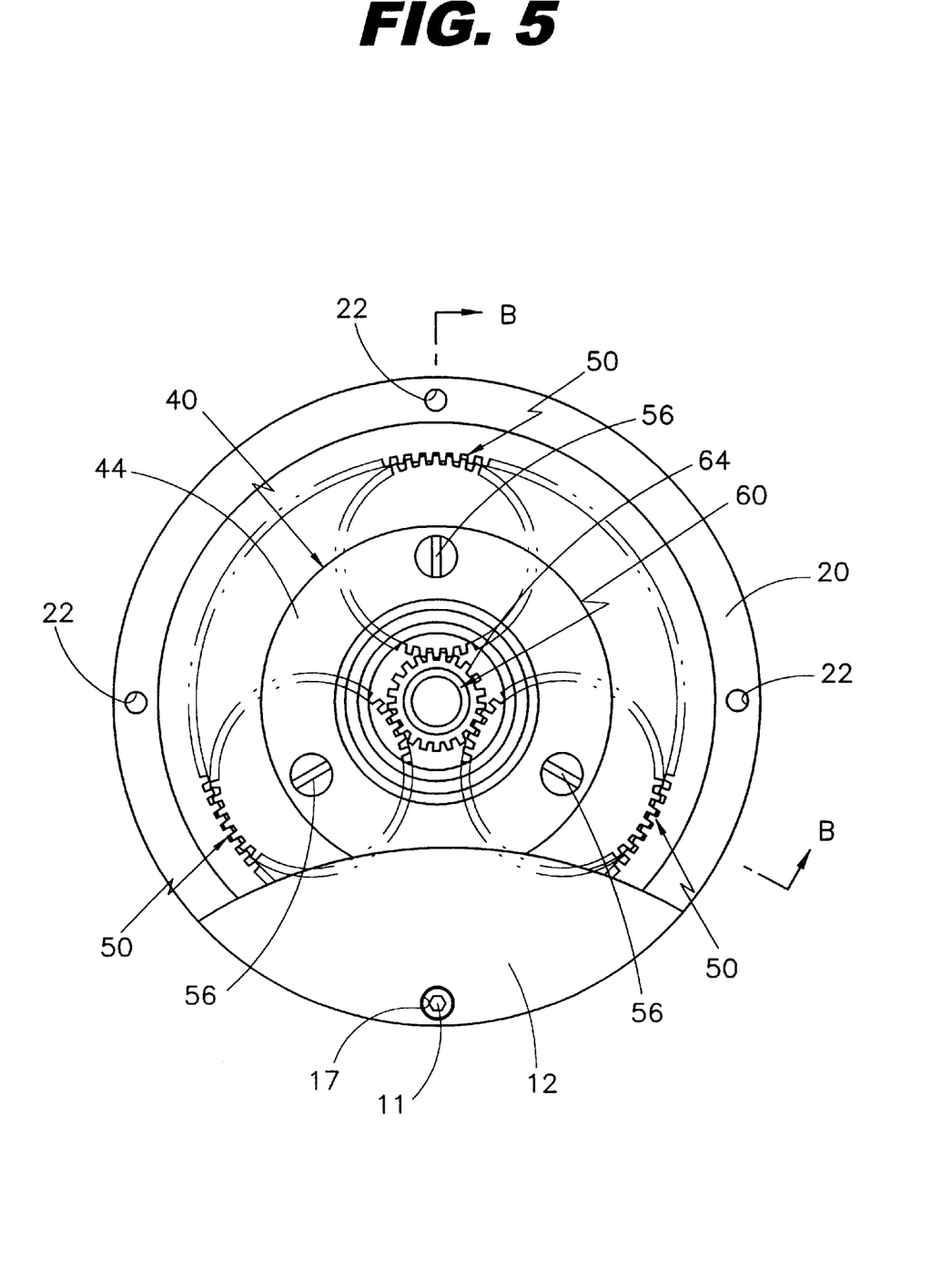
FIG. 5 is a partially sectioned side view of the reduction device of FIG. 4.

Referring to FIG. 4, there is shown an exploded perspective view illustrating another reduction device having a reverse rotation preventing function in accordance with a second embodiment of the present invention. FIG. 5 is a partially sectioned side view of the reduction device of FIG. 4; and FIG. 6 of cross-sectional view taken along the line B—B of FIG. 5.

Figure 6:
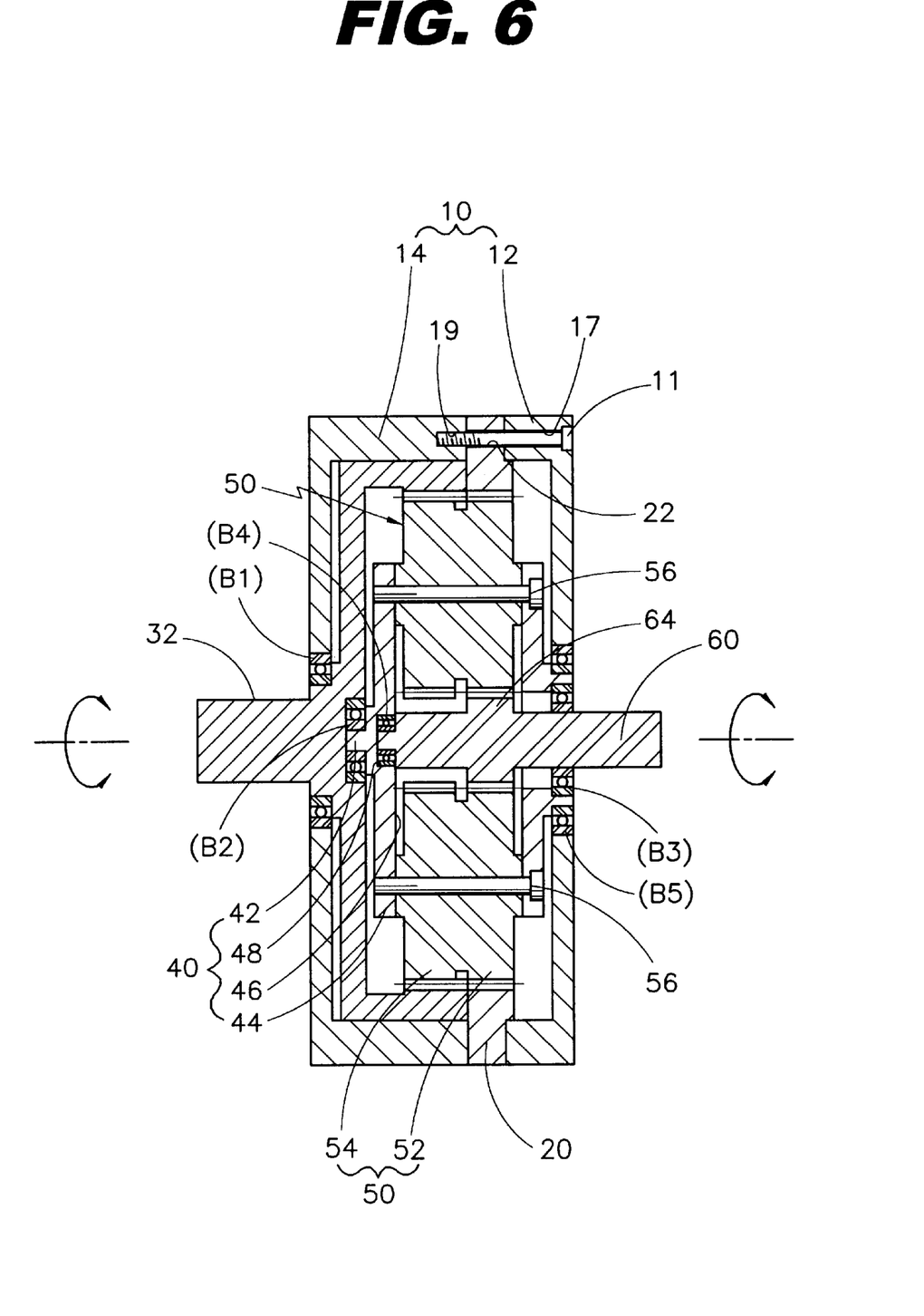
FIG. 6 is a cross-sectional view taken along the line B—B of FIG. 5.

The present embodiment is provided for rendering higher reduction ratio as compared to the construction according to the first embodiment in which the input shaft 60 and the carrier 40 are integrally formed with each other. As shown in FIGS. 4 through 6, according to the present embodiment, the input shaft 60 is provided as a separate element. The input shaft 60 has one end which extends into the receiving room 46 through the second circular plate 44 and the other end which projects out of the case 10 through the first center opening 16. The one end of the input shaft 60 is formed with a guide protrusion 62 which is rotatably supported by a bearing B4 fitted into a groove 48 formed on a center portion of an inner surface of the first circular plate 44. In the receiving room 46, a first sun gear 64 is secured around a circumferential outer surface of the input shaft 60 to be meshed with the first planetary gear parts 52 of the double planetary gears 50.

To allow the input shaft 60 extending into the receiving room 46 to be smoothly rotated, the second circular plate 44 is formed with an inserting hole, and an annular boss 49 is projectedly formed around the inserting hole on an outer surface of the second circular plate 44. The annular boss 49 is fitted into a bearing B5 which in turn is fitted into the first center opening 16 of the first case part 12.

Hereinafter, operations of the reduction device having a reverse rotation preventing function according to the present embodiment, constructed as mentioned above, will be described in detail.

If the input shaft 60 is rotated by the driving force inputted thereto from the outside driving means, since the first sun gear 64 is integrally rotated therewith, the double planetary gears 50 meshed with the first sun gear 64 rotate around the fixing pins 56, namely, on their own axes, respectively, and at the same time, the first planetary gear parts 52 of the double planetary gears 50 revolve around the axis of the carrier 40 while being meshed with the first internal gear part of the fixed ring gear 20.

At the same time, due to the fact that the second planetary gear parts 54 of the double planetary gears 50 are meshed with the second internal gear part of the output ring gear 34, the output member 30 including the output shaft 32 is rotated. At this time, rotational velocity of the input shaft 60 rotated by the outside driving means (not shown) is changed relying upon differences in a number of teeth and a module among the first sun gear 64, the first and second planetary gear parts 52 and 54 of the double planetary gear 50 and the second internal gear part of the output ring gear 34, to be represented as rotational velocity of the output shaft 32. That is, reduction ratio i of the reduction device having a reverse rotation preventing function according to the present embodiment is denoted as ratio of rotational velocity n2 of the output shaft 32 to rotational velocity n1 of the input shaft 60, as given by an equation i=n2/n1. The reduction ratio can be otherwise denoted as ratio of a number of teeth Ze or a module of the first sun gear 64 to a number of teeth Zc or a module of the output ring gear 34 by ratio of a number of teeth Zb or a module of the second planetary gear part 54 to a number of teeth Za or a module of the first planetary gear part 52, as given by an equation i=(Ze/Zc)·(Zb/Za).

Accordingly, higher reduction ratio can be obtained due to the fact that the input shaft 60 is provided as a separate element and the first sun gear 64 is secured to the circumferential outer surface of the input shaft 60 to be meshed with the fist planetary gear parts 52 of the double planetary gears 50. In this connection, even if the input shaft 60 is provided as a separate element, because the reverse load of the output shaft 32 is effectively braked by the double planetary gears 50 not to be transferred to the input shaft 60, the reduction device according to the present embodiment of the present invention also accomplishes a reverse rotation preventing function without using a separate arrangement.

Figure 7:
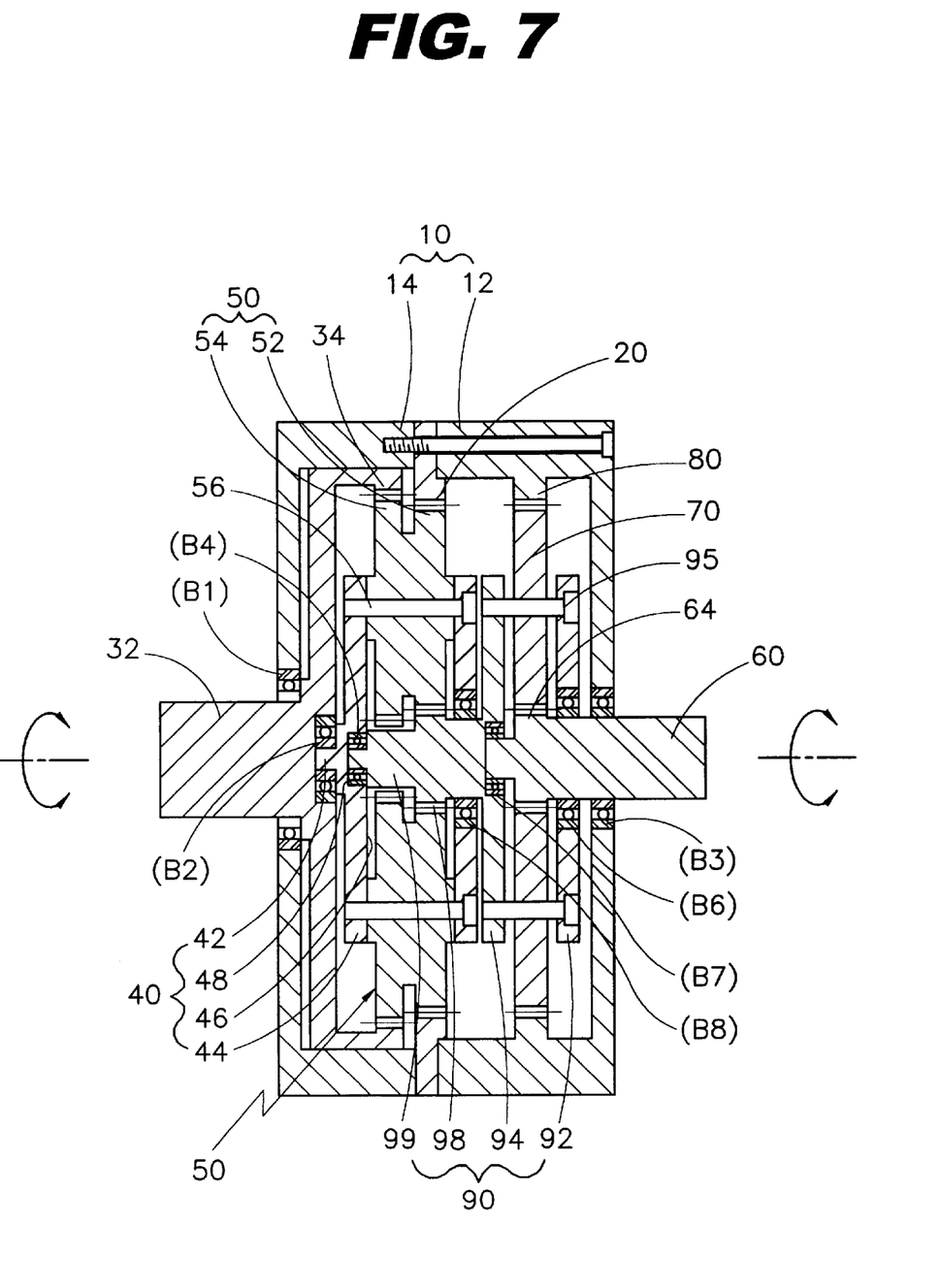
FIG. 7 is a cross-sectional view illustrating still another reduction device having a reverse preventing function in accordance with a third embodiment of the present invention.

Referring to FIG. 7, there is shown a cross-sectional view illustrating still another reduction device having a reverse preventing function in accordance with a third embodiment of the present invention.

The present embodiment is provided for rendering more higher reduction ratio as compared to the construction according to the second embodiment. As shown in FIG. 7, in accordance with this embodiment of the present invention, the case 10 having the pair of case parts 12 and 14 assembled with each other to define the receiving space therebetween, possesses a first fixed ring gear 80. The first fixed ring gear 80 is integrally formed on the circumferential inner surface of the case 10 and has a first internal gear part. A second fixed ring gear 20 is coupled between and to the pair of case parts 12 and 14 and has a second internal gear part. The output member 30 is rotatably received in the receiving space of the case 10 and includes the output ring gear 34 and the output shaft 32. The output ring gear 34 has a third internal gear part, and the output shaft 32 is formed on the outer surface of the bottom wall of the output member 30 and projects out of the case 10 through the second center opening 18.

A carrier 90 of the present embodiment is received in the receiving space of the case 10. The carrier 90 includes the pair of circular plates 44, the first input shaft 60, a second input shaft 99 and a mounting plate 92. The pair of circular plates 44 defines the receiving room 46 therebetween. The first input shaft 60 has one end which projects out of the case 10 through the first center opening 16. The first input shaft 60 further has the first sun gear 64 which is secured around the circumferential outer surface thereof. The second input shaft 99 has one end which is formed with an outward flange part 94 and by which the other end of the first input shaft 60 is rotatably supported and the other end which extends into the receiving room 46 through the second circular plate 44 and is rotatably supported by the first circular plate 44. The other end of the second input shaft 99 is formed with a guide protrusion which is rotatably supported by the bearing B4 fitted into the groove 48 formed on the center portion of the inner surface of the first circular plate 44. The second input shaft 99 possesses a second sun gear 98 which is fastened around a circumferential outer surface thereof. The mounting plate 92 is supported by the outward flange part 94 of the second input shaft 99 for defining a mounting space therebetween. The first input shaft 60 is rotatably supported by a bearing B6 which is fitted into an opening formed on the mounting plate 92. The other end of the first input shaft 60 is formed with a guide protrusion which is rotatably supported by a bearing B7 fitted into a groove formed on a center portion of the one end of the second input shaft 99.

Also, the one end of the second input shaft 99 is rotatably supported by a bearing B8 which is fitted into the inserting hole formed on the center portion of the second circular plate 44.

Further, according to the present embodiment of the present invention, three single planetary gears 70 are received in the mounting space and rotatably secured to the outward flange part 94 and the mounting plate 92 by three fixing pins 95, respectively. Each of the single planetary gears 90 is meshed with the first sun gear 64 of the first input shaft 60 and the first internal gear part of the first fixed ring gear 80. The three double planetary gears 50 are received in the receiving room 46 of the carrier 40 and rotatably secured to the pair of circular plates 44. Each of the double planetary gears 50 has the first planetary gear part 50 which is meshed with the second sun gear 98 of the second input shaft 99 and the second internal gear part of the second fixed ring gear 20 and a second planetary gear part 54 which is meshed with the third internal gear part of the output ring gear 34. The first and second planetary gear parts 52 and 54 of each double planetary gear 50 are integrally formed with each other.

Hereinafter, operations of the reduction device having a reverse rotation preventing function according to the present third embodiment, constructed as mentioned above, will be described in detail.

If the input shaft 60 is rotated by the driving force inputted thereto from the outside driving means, since the first sun gear 64 is integrally rotated therewith, the single planetary gears 70 meshed with the first sun gear 64 rotate around the fixing pins 95, namely, on their own axes, respectively, and at the same time, revolve around an axis of the first input shaft 60 while being meshed with the first internal gear part of the first fixed ring gear 80.

By this, the second input shaft 99 is rotated due to the fact that the single planetary gears 70 are secured to the outward flange part 94 of the carrier 90 by the fixing pins 95. The carrier 90 is also rotated due to the fact that the second sun gear 98 are meshed with the first planetary gear parts 52 of the double planetary gears 50 which are secured to the pair of circular plates 44. Accordingly, the double planetary gears 50 meshed with the second sun gear 98 rotate around the fixing pins 56, namely, on their own axes, respectively, and at the same time, the first planetary gear parts 52 of the double planetary gears 50 revolve around the axis of the carrier 90 while being meshed with the second internal gear part of the second fixed ring gear 20.

At the same time, due to the fact that the second planetary gear parts 54 of the double planetary gears 50 are meshed with the third internal gear part of the output ring gear 34, the output member 30 including the output shaft 32 is rotated. At this time, rotational velocity of the input shaft 60 rotated by the outside driving means (not shown) is changed relying upon differences in a number of teeth and a module among the first sun gear 64, the single planetary gears 70, the second sun gear 98, the first and second planetary gear parts 52 and 54 of the double planetary gear 50 and the third internal gear part of the output ring gear 34, to be represented as rotational velocity of the output shaft 32. Accordingly, more higher reduction ratio can be obtained by the present third embodiment of the present invention.

On the other hand, while the reduction device of the present invention is constructed such that it includes one carrier and/or one or two sun gears to obtain elevated reduction ratio, the present invention must not be understood as being limited to this construction, and a plurality of carriers and/or sun gears may be used for achieving more elevated reduction ratio.

As a result, by a reduction device having a reverse rotation preventing function of the present invention, advantages are provided in that elevated reduction ratio of high precision can be obtained. Since a reverse load is not transferred from an output shaft to an input shaft, it is not needed to furnish a separate reverse rotation preventing device. Since the reduction device achieves a simple structure of a reduction gear and this reduction gear is coaxially disposed with a plurality of double planetary gears, volume of the reduction device is reduced, and a peculiar manufacturing technique is not needed. Since the whole load is uniformly distributed over the plurality of double planetary gears while being transferred from the input shaft to the output shaft, teeth are prevented from being abraded and gears are stably meshed one with another, whereby endurability and operation reliability are improved. Further, since the reduction device is easily manufactured by an existing gear cutting machine, special manufacturing equipment or a peculiar manufacturing technique is not needed thereby to be suited for mass production while reducing manufacturing cost.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A reduction device comprising:

a case having a pair of case parts assembled with each other to define a receiving space, each case part having a center opening to be communicated with the receiving space;

a fixed ring gear coupled between and to the pair of case parts and being formed with a first internal gear part having a first predetermined number of teeth;

an output member rotatably received in the receiving space of the case and having an output ring gear and an output shaft, the output ring gear being formed with a second internal gear part having a second predetermined number of teeth, the output shaft being formed on a bottom wall of the output member and projecting out of the case through a first center opening, the first and second internal gear parts having the same inner diameter;

a carrier received in the receiving space of the case and having one end rotatably supported by the bottom wall of the output member and the other end being formed with an input shaft which projects out of the case through a second center opening and to which driving force is transferred, the carrier further having a pair of circular plates which define a receiving room therebetween; and a plurality of double planetary gears received in the receiving room of the carrier and rotatably secured to the pair of circular plates, each of the double planetary gears having a first planetary gear part which is meshed with the first internal gear part of the fixed ring gear and a second planetary gear part which is meshed with the second internal gear part of the output member, the first and second planetary gear parts of each double planetary gear being integrally formed with each other.

2. The reduction device as claimed in claim 1, wherein the input shaft of the carrier is provided as a separate element and has one end which extends into the receiving room through a first circular plate remote from the output member and is rotatably supported by a second circular plate adjacent to the output member and the other end which projects out of the case through the second center opening, the input shaft further having a first sun gear which is fastened around a circumferential outer surface thereof and is meshed with the first planetary gear parts of the plurality of double planetary gears.

3. The reduction device as claimed in claim 1, wherein the fixed ring gear is integrally formed on an inner surface of the case.

4. A reduction device comprising:
- a case having a pair of case parts assembled with each other to define a receiving space, each case part having a center opening to be communicated with the receiving space, the case possessing a first fixed ring gear which is integrally formed on an inner surface thereof and has a first internal gear part;
- a second fixed ring gear coupled between and to the pair of case parts and having a second internal gear part;
- an output member rotatably received in the receiving space of the case and having an output ring gear and an output shaft, the output ring gear having a third internal gear part, the output shaft being formed on a bottom wall of the output member and projecting out of the case through a first center opening;
- a carrier received in the receiving space of the case and having
  - a pair of circular plates defining a receiving room therebetween,
  - a first input shaft having one end projecting out of the case through a second center opening, the first input shaft possessing a first sun gear which is fastened around a circumferential outer surface thereof,
  - a second input shaft having one end which is formed with an outward flange part and by which the other end of the first input shaft is rotatably supported and the other end which extends into the receiving room through a first circular plate remote from the output member and is rotatably supported by a second circular plate adjacent to the output member, the second input shaft possessing a second sun gear which is fastened around a circumferential outer surface thereof, and
  - a mounting plate supported by the outward flange part of the second input shaft for defining a mounting space therebetween;
- a plurality of single planetary gears received in the mounting space and rotatably secured to the outward flange part and the mounting plate, each of the single planetary gear being meshed with the first sun gear of the first input shaft and the first internal gear part of the first fixed ring gear; and
- a plurality of double planetary gears received in the receiving room of the carrier and rotatably secured to the pair of circular plates, each of the double planetary gears having a first planetary gear part which is meshed with the second sun gear of the second input shaft and the second internal gear part of the second fixed ring gear and a second planetary gear part which is meshed with the third internal gear part of the output member, the first and second planetary gear parts of each double planetary gear being integrally formed with each other.

* * * * *